Patented Mar. 4, 1941

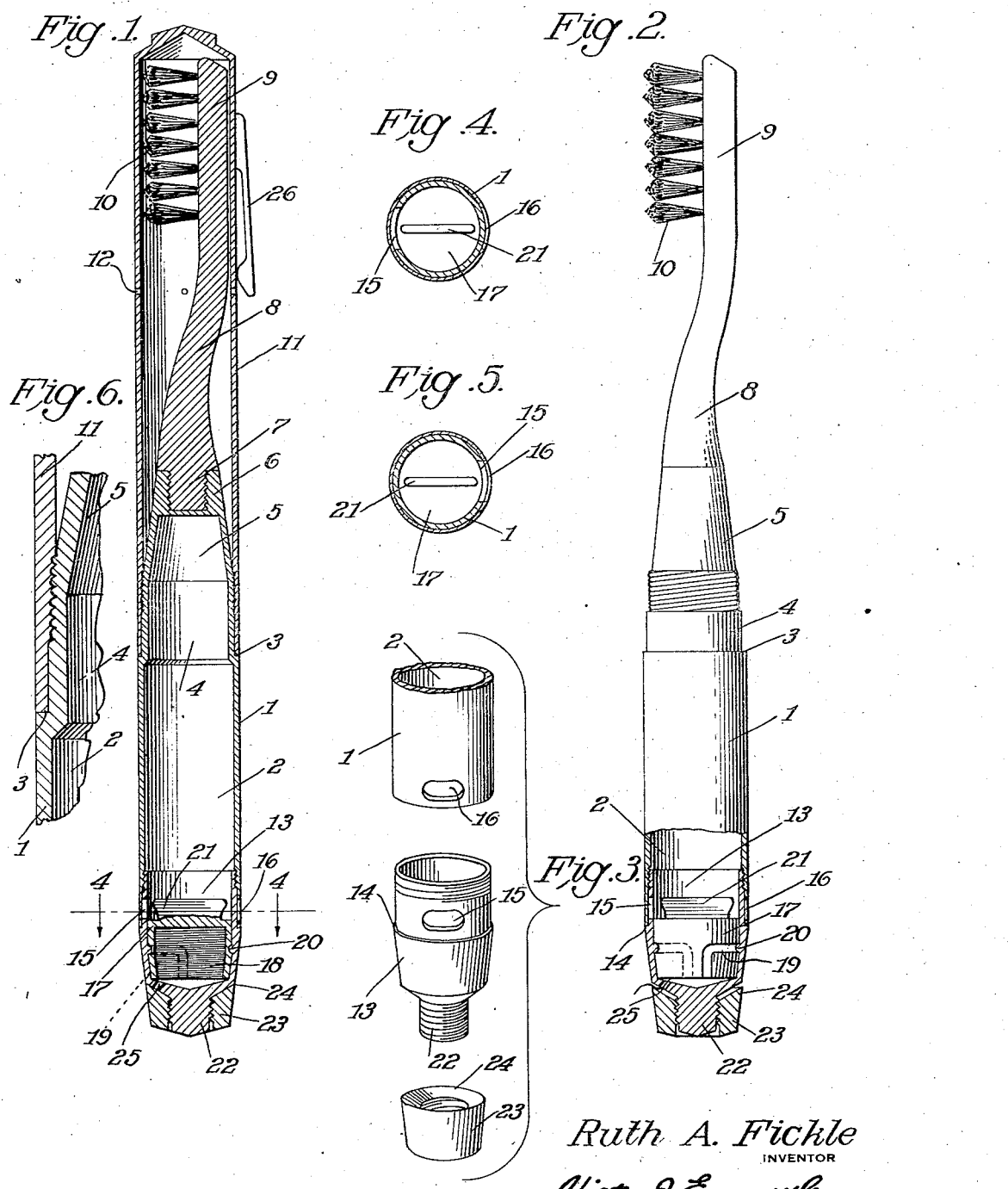

2,233,522

UNITED STATES PATENT OFFICE 2,233,522

DENTAL COMPACT

Ruth A. Fickle, Portsmouth, Va.

Application March 5, 1940, Serial No. 322,394

2 Claims. (Cl. 132—92)

This invention relates to dental appliances and its general object is to provide what I term a dental compact, in that it includes all the essential elements to properly care for and retain the teeth in a clean condition, there being a brush, a cover therefor, a dentifrice container, a floss holder, cutting means for the floss, and a dispensing cap for the container, all detachably associated in a single unit which is not only neat and ornamental in appearance, but is small and light in weight, so that it can be conveniently carried in the purse or pocket of the user, as well as fastened therein, there being a clip for that purpose, and the clip together with the shape and manner of assembling the cover, container, cap and cutter, gives the appearance of a fountain pen.

A further object is to provide a dental compact including a dentifrice container and a cap, each having a dispensing opening therein for the dentifrice, and the cap not only acts as a valve for movement on the container for disposing the openings into and out of registration, but provides a receptacle for the dental floss holder, as well as has an opening therein for the passage of the floss therethrough and carries the cutter for severing the floss in strands of any desired length.

Another object is to provide a dental compact that is constructed whereby access can be had to the brush and floss in an easy and expeditious manner, yet they are retained in a clean and sanitary condition when not in use, and the dentifrice can be readily dispensed directly on the brush which is removable for that purpose, as well as to allow it to be changed or renewed when necessary or desired.

A still further object is to provide a dental compact that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a longituidnal sectional view taken through the compact which forms the subject matter of the present invention.

Figure 2 is a view partly in section, with the cover removed from the brush portion of my de-vice, and illustrates the manner of removing a strand of floss from the holder thereof.

Figure 3 is a perspective view illustrating a fragmentary portion of the container, the cap therefor and the cutting member for the floss, all being separated to show the relation thereof with respect to each other.

Figure 4 is a sectional view taken approximately on line 4—4 of Figure 1, looking in the direction of the arrows.

Figure 5 is a similar view with the dispensing openings in registration.

Figure 6 is an enlarged fragmentary view, illustrating the threaded connection of the brush cover with the dentifrice container.

Referring to the drawing in detail, it will be noted that my compact in the form as shown includes a tubular container 1 providing a chamber 2 for the dentifrice, as well as a handle for the brush, as will be apparent upon inspection of Figure 2.

The container 1 is reduced adjacent one end thereof to provide a shoulder 3 and a cylindrical portion 4 that merges into a tapered or truncated conical portion 5, the latter having its outer end closed by a solid portion 6 provided with a threaded socket for receiving a threaded stud 7 formed on the inner end of the shank 8 of a brush head 9.

The shank 8 is curved for disposing the outer face of the brush head slightly inwardly of the plane of the outer surface of the cylindrical portion 4 and the brush head may be rounded transversely but in any event the bristles 10 thereof are of a length to allow for free application of a cover 11 about the brush head and upon the cylindrical portion 4 of the container or handle. The cover is of course of tubular formation and of a diameter to fit about the cylindrical portion 4 which is threaded for a portion of its length from its juncture with the tapered portion 5, for receiving threads on the interior surface of the cover that terminate a considerable distance inwardly of its inner end, as best shown in Figure 6 which likewise illustrates that the threads have rounded faces, which facilitates expeditious application and removal of the cover with respect to the container, and when fully applied, the inner end of the cover bears against the shoulder 3. The outer end of the cover is closed and the cover is provided with minute ventilating openings 12.

The container is interiorly threaded inwardly from the open inner end thereof for threadedly receiving a skirted cap 13 for closing the same to retain the dentifrice therein, and the cap is reduced to provide the skirt and an abutment shoulder 14 at the juncture of the skirt with the remaining portion of the cap, for receiving the inner end of the container, for the disposal of the container and cap flush with each other. The skirt is provided with a substantially oval shaped opening 15 which cooperates with a like shaped opening 16 in the container for dispensing the dentifrice therefrom when the openings are in registration with each other, as shown in Figure 5, it being obvious that the cap is turned on the threads for disposing the openings into and out of registration.

The cap is slightly tapered inwardly from the skirt portion thereof for fittingly receiving a holder 17 for a roll 18 of floss, the roll having bayonet slots 19 therein to receive teats 20 formed on the inner surface of the cap for securing the holder therein against casual removal, and the holder is in the for of a receptacle having an open end through which is inserted the roll 18. The closed end of the holder or receptacle has formed thereon a handle 21.

Formed on and extending outwardly from the outer end of the cap is a threaded stud 22 for threadedly receiving a ring member 23 and the inner face of the ring member is beveled to provide an outer cutting edge 24. The outer end or wall of the cap is likewise beveled to fittingly receive the beveled face of the ring member, as well as is provided with an opening 25 adjacent to the outer edge thereof for the passage of the floss therethrough, as clearly shown in Figure 2, from which it will be understood that the ring member is threaded outwardly on its stud to allow for the free passage of the floss through the opening 25 and when a strand of the desired length is passed therethrough, it is moved against the cutting edge 24 to be severed from the roll, as will be apparent.

The cover 11 preferably has a clamping clip 26 secured thereto so that the compact can be fastened within the purse or pocket of the user.

From the above description and disclosure in the drawing, it is believed that the operation and use of my compact will be obvious, but it might be mentioned that when it is desired to use the same for brushing the teeth, the cover 11 is removed and the brush may likewise be removed, thence the cap 13 is rotated for disposing the opening thereof in registration with the opening 16 of the container for dispensing the dentifrice from the latter on the bristles. The cap is then threaded back to its normal tight position on the container for disposing the openings 15 and 16 out of registration, it being obvious that only a half turn of the cap is necessary for disposing the openings into and out of registration with each other, and thence the brush is replaced on its handle, so that the teeth can be cleaned in the usual manner. It will be further obvious that the dentifrice used with my compact is of a form that will freely run through the dispensing openings, and that the dentifrice can be applied to a clean surface if desired, and thence to the brush. In that event, the brush does not have to be removed from its handle or container.

The manner of obtaining the floss from the holder and cutting the same into the desired lengths for use, has been previously described, and it will be apparent from Figure 2 that the floss is threaded through the opening 25, before the holder 17 is applied within the cap, so that a length of the floss will always be passed through the opening 25 to be grasped by the user for removing the same from the roll.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a dental compact, a container providing a brush handle having an open end, a cap for closing the open end, said cap being hollow to provide a receptacle, a holder for receiving dental floss and fitting within the cap, teats formed within the cap upon diametrically opposite sides thereof, said holder having bayonet slots therein for receiving the teats for detachably securing the holder within the cap, said cap having an opening therein for the passage of the floss therethrough, and means threadedly associated with the cap for cutting the floss that extends through the opening.

2. In a dental compact, a container providing a brush handle having an open end, a cap for closing the open end, said cap being hollow to provide a receptacle, a holder for receiving dental floss and fitting within the receptacle, teats formed within the cap upon diametrically opposite sides thereof, said holder having bayonet slots therein for receiving the teats for detachably securing the holder within the cap, said cap having an opening therein for the passage of the floss therethrough, a stud formed on and extending outwardly from the cap, and a ring member threaded on the stud and having a beveled face providing an annular cutting edge for cutting the floss that extends through the opening.

RUTH A. FICKLE.